(12) United States Patent
Tomizawa (10) Patent No.: US 9,457,834 B2
(45) Date of Patent: Oct. 4, 2016

(54) DRIVE DEVICE AND ELECTRIC POWER STEERING APPARATUS

(71) Applicant: DENSO CORPORATION, Kariya, Aichi-pref (JP)

(72) Inventor: Hiroki Tomizawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/878,234

(22) Filed: Oct. 8, 2015

(65) Prior Publication Data

US 2016/0101808 A1 Apr. 14, 2016

(30) Foreign Application Priority Data

Oct. 10, 2014 (JP) .................................. 2014-209041

(51) Int. Cl.
| | |
|---|---|
| *B62D 5/04* | (2006.01) |
| *F16H 55/24* | (2006.01) |
| *H02K 5/173* | (2006.01) |
| *H02K 7/08* | (2006.01) |

(52) U.S. Cl.
CPC ............. *B62D 5/0409* (2013.01); *F16H 55/24* (2013.01); *H02K 5/1732* (2013.01); *H02K 7/081* (2013.01); *H02K 2205/03* (2013.01); *H02K 2213/03* (2013.01)

(58) Field of Classification Search
None
See application file for complete search history.

(56) References Cited

U.S. PATENT DOCUMENTS

| | | | |
|---|---|---|---|
| 2007/0147717 A1 | 6/2007 | Kusano et al. | |
| 2008/0006472 A1* | 1/2008 | Song | B62D 5/0409 180/444 |
| 2008/0117889 A1* | 5/2008 | Moitrel | H04W 12/12 370/345 |
| 2010/0116582 A1* | 5/2010 | Rho | B62D 5/0409 180/444 |
| 2011/0067946 A1* | 3/2011 | Kim | B62D 5/0409 180/444 |
| 2011/0240399 A1* | 10/2011 | Suzuki | B62D 5/0409 180/444 |
| 2013/0140964 A1* | 6/2013 | Matsunaga | B62D 5/0403 310/68 B |
| 2014/0182401 A1* | 7/2014 | Ishii | B62D 5/0409 74/89.14 |

FOREIGN PATENT DOCUMENTS

JP 2010-25132 A 2/2010

* cited by examiner

*Primary Examiner* — Tony Winner
(74) *Attorney, Agent, or Firm* — Knobbe, Martens, Olson & Bear, LLP (57) ABSTRACT

A first bearing rotatably supports an opposite end part of a shaft, which is opposite from a worm. An O-ring is installed between the first bearing and an inner wall of a bearing box. A radial direction of the rotatable shaft, along which the worm and a worm wheel are placed one after another, is defined as an X-direction, and another radial direction of the rotatable shaft, which is perpendicular to the X-direction, is defined as a Y-direction. A distance, which is measured along the Y-direction between two opposed parts of an inner wall of the bearing box that are opposed to each other along the Y-direction, is larger than a distance, which is measured along the X-direction between two opposed parts of the inner wall of the bearing box, which are opposed to each other along the X-direction.

5 Claims, 8 Drawing Sheets

INSTALLATION LOAD F1

DRIVE DEVICE AND ELECTRIC POWER STEERING APPARATUS

CROSS REFERENCE TO RELATED APPLICATION

This application is based on and incorporates herein by reference Japanese Patent Application No. 2014-209041 filed on Oct. 10, 2014.

TECHNICAL FIELD

The present disclosure relates to a drive device and an electric power steering apparatus including the same.

BACKGROUND

Previously, an electric power steering apparatus, which assists a steering operation of a driver of a vehicle, has been known.

For example, JP5462374B2 (corresponding to US2013/0140964A1) discloses an electric motor that serves as a drive device used in an electric power steering apparatus. In this motor, a rotatable shaft is fixed to a rotor, and an end part of the rotatable shaft, which is located on an output end side, is rotatably supported by a bearing, and an opposite end part of the rotatable shaft, which is opposite from the output end side, is rotatably supported by another bearing. Among these bearings, the bearing, which supports the opposite end part of the rotatable shaft, which is opposite from the output end side, is received in a bearing box installed to a case that receives the stator and the rotor. An O-ring, which is installed between the inner wall of the bearing box, and the bearing, absorb a vibrating force, which is exerted in a radial direction of the rotatable shaft due to a positional deviation between a center of gravity of the magnet installed to an outer peripheral surface of the rotor and an axis of the rotatable shaft, or unbalance between a magnetic force of the stator and a magnetic force of the rotor. In this way, the motor limits the generation of the vibrations and noises at the time of rotating the rotatable shaft.

However, in JP5462374B2 (corresponding to US2013/0140964A1), the O-ring, which is installed to the bearing of the motor, applies a load to the bearing box and the bearing in such a manner that the load is applied to the bearing box and the bearing in a uniform manner along an entire circumferential extent of the O-ring. Therefore, in order to withstand the vibrations generated at the time of transmitting the torque from the worm connected to the output end of the shaft of the motor to the worm wheel, it is necessary to increase the hardness of the material of the O-ring or to increase the amount of compression of the O-ring.

However, when such a modification is made, an installation load, which is exerted at the time of installing the bearing and the O-ring to the bearing box, is increased. This might possibly cause disadvantages, such as removal of the O-ring, cutting (severing) of the O-ring, or generation of an impression on the bearing. When such a disadvantage occurs, the vibrations and noises generated from the motor may possibly be increased.

SUMMARY

The present disclosure is made in view of the above disadvantages.

According to the present disclosure, there is provided a drive device that outputs a drive force, which assists a steering operation of a driver of a vehicle by rotating a worm that is meshed with a worm wheel installed to a drive force transmission shaft for transmitting a steering force of the driver to a steerable wheel of the vehicle. The drive device includes a stator, a rotor, a rotatable shaft, a case, a bearing box, a bearing and a resilient member. The rotor is rotatably placed on a radially inner side of the stator. The rotatable shaft is rotatable integrally with the rotor and is connectable with one axial end part of the worm. The case receives the stator and the rotor. The bearing box is placed on an opposite side of the case, which is opposite from the worm. The bearing is received in the bearing box and rotatably supports an end part of the rotatable shaft, which is opposite from the worm. The resilient member is in a form of a ring and is placed between an inner wall of the bearing box and an outer race of the bearing. A radial direction of the rotatable shaft, along which the worm and the worm wheel are placed one after another, is defined as an X-direction, and another radial direction of the rotatable shaft, which is perpendicular to the X-direction, is defined as a Y-direction. A distance, which is measured along the Y-direction between two opposed parts of the inner wall of the bearing box that are opposed to each other along the Y-direction, is larger than a distance, which is measured along the X-direction between two opposed parts of the inner wall of the bearing box, which are opposed to each other along the X-direction.

There is also provided an electric power steering apparatus that assists a steering operation of a driver of a vehicle who is operating a steering wheel of the vehicle. The electric power steering apparatus includes the drive device discussed above, the worm, the worm wheel, and the drive force transmission shaft. The worm is connected to the one axial end part of the rotatable shaft, which projects from the case of the drive device. The worm is rotatable integrally with the rotatable shaft. The worm wheel is meshed with the worm. The drive force transmission shaft is rotatable integrally with the worm wheel and transmits a steering force to the steerable wheel.

BRIEF DESCRIPTION OF THE DRAWINGS

The drawings described herein are for illustration purposes only and are not intended to limit the scope of the present disclosure in any way.

DETAILED DESCRIPTION

Various embodiments of the present disclosure will be described with reference to the accompanying drawings.

First Embodiment

FIGS. 1 to 5 show a first embodiment of the present disclosure. An electric power steering apparatus 1 of the first embodiment is an apparatus that assists a steering operation of a driver of a vehicle for steering a steering wheel 2 of the vehicle with a drive force of an electric motor (hereinafter referred to as a motor) 10, which serves as a drive device.

Figure 1:
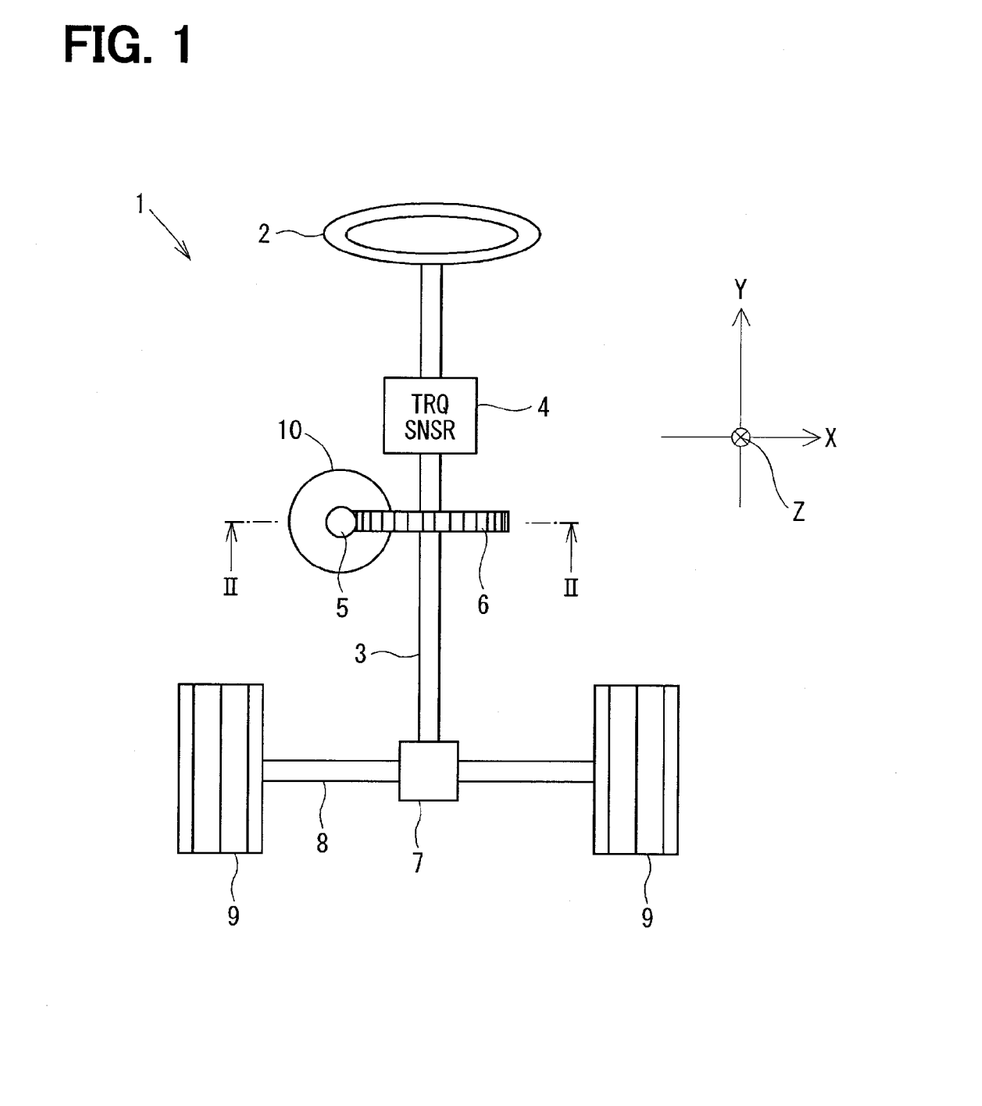
FIG. 1 is a schematic diagram showing an electric power steering apparatus according to a first embodiment of the present disclosure.

As shown in FIG. 1, in the electric power steering apparatus 1, the motor 10 outputs an assist torque for assisting the steering operation of the driver based on a signal, which is obtained from a torque sensor 4 for sensing a torque generated at a column shaft 3 through the operation of the steering wheel 2 by the driver, and a signal(s), such as a signal of a vehicle speed obtained from a controller area network (CAN) of the vehicle. The assist torque, which is outputted from the motor 10, is transmitted to the column shaft 3 through a worm (also referred to as a worm shaft) 5, and a worm wheel 6. Rotational movement of the column shaft 3 is converted into linear movement of a rack shaft 8 through a pinion gear 7. The steerable wheels 9 are steered according to the amount of displacement of the rack shaft 8.

The column shaft 3, the pinion gear 7, and the rack shaft 8 serve as an example of a drive force transmission shaft of the present disclosure.

Figure 2:
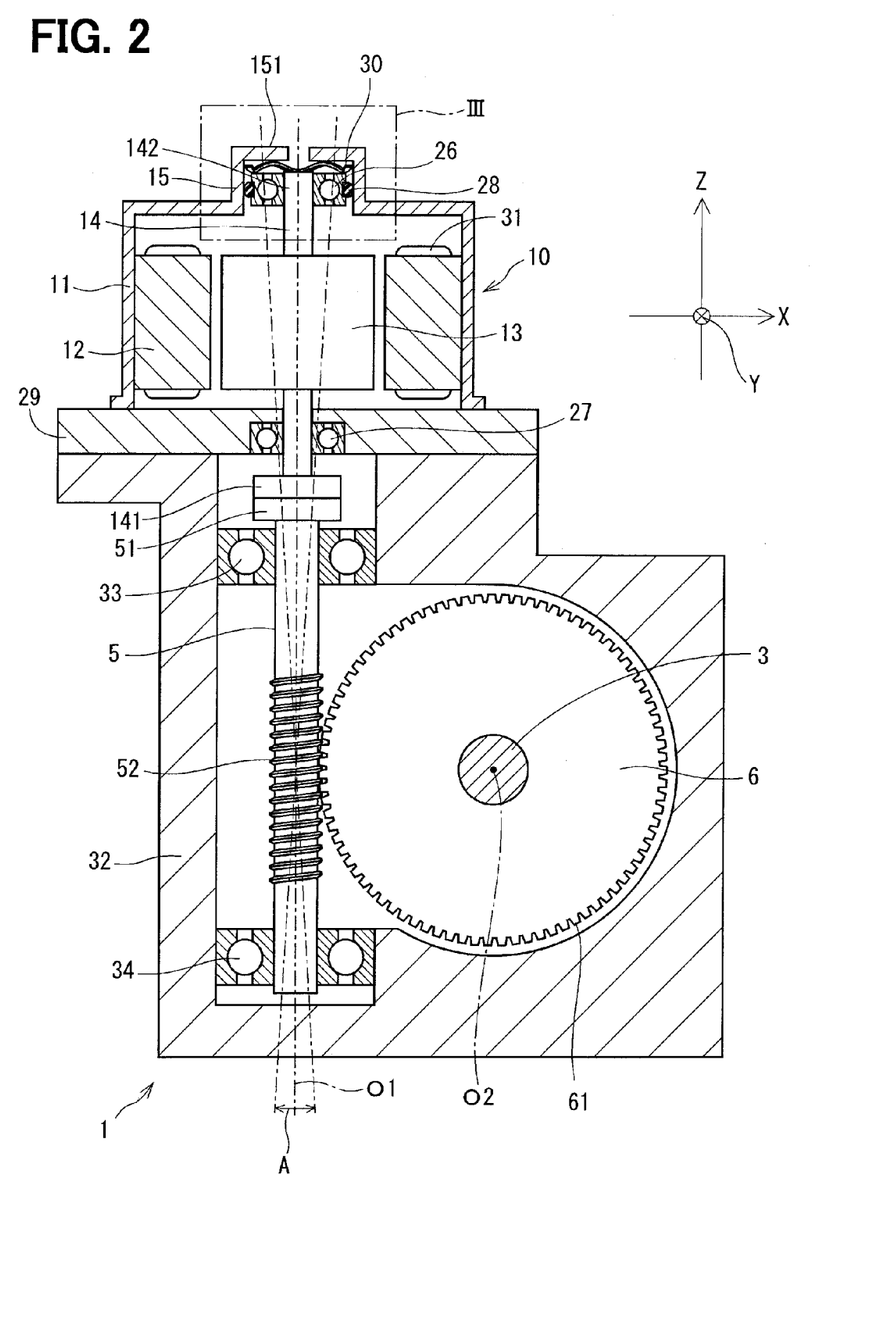
FIG. 2 is a cross sectional view taken along line II-II in FIG. 1.

As shown in FIG. 2, the motor 10 includes a case 11, a stator 12, a rotor 13, a rotatable shaft 14, a bearing box 15, a first bearing 26, a second bearing 27, and an O-ring (serving as a resilient member also referred to as an elastic member) 28.

The motor 10 may be formed integrally with a controller (not shown), which controls a driving operation (energization) of the motor 10. Alternatively, the motor 10 may be formed separately from the controller.

The motor 10 of the first embodiment is a brushless motor. The motor 10 receives the stator 12 and the rotor 13 in an inside of the case 11, which is configured into a cup form. A worm 5 side of the case 11, is fixed to a frame end 29. The bearing box 15, which is placed on an opposite side of the case 11 that is opposite from the worm 5, receives the first bearing 26, the O-ring 28 and the wave washer 30.

The stator 12 is configured into a cylindrical tubular form and is made of a magnetic material. Coils 31 are wound around slots (not shown) of the stator 12, which are arranged one after another in a circumferential direction of the stator 12.

The rotor 13 is configured into a cylindrical tubular form and is made of a magnetic material. The rotor 13 is placed on a radially inner side of the stator 12. The rotor 13 is rotatable relative to the stator 12.

The rotatable shaft 14 is fixed to a rotational center of the rotor 13 and is rotated integrally with the rotor 13. An end part 142 of the rotatable shaft 14, which is opposite from an output end part 141 of the rotatable shaft 14, is rotatably supported by the first bearing 26 installed to the bearing box 15. The output end part 141 of the rotatable shaft 14 is rotatably supported by the second bearing 27. The first bearing 26 of the present embodiment serves as one example of a bearing of the present disclosure.

The O-ring 28 is installed between the first bearing 26 and the bearing box 15. The first bearing 26, the bearing box 15 and the O-ring 28 will be described later in detail.

In the motor 10, when the controller energizes the coils 31, the stator 12 generates a rotating magnetic field. Thereby, the rotor 13 and the rotatable shaft 14 are rotated about the axis.

The worm 5 is connected to the output end part 141 of the rotatable shaft 14. The rotatable shaft 14 and the worm 5 are generally coaxial with each other. The output end part 141 of the rotatable shaft 14 and the distal end part 51 of the worm 5 are connected with each other in a manner that disable relative rotation therebetween through, for example, spline coupling, or coupling between a recess provided to one of the output end part 141 and the distal end part 51 and a projection provided to the other one of the output end part 141 and the distal end part 51. In this way, the worm 5 is rotated integrally with the rotatable shaft 14.

The one end part and the other end part of the worm 5 are rotatably supported by a third bearing 33 and a fourth bearing 34, respectively, which are installed to a housing 32. The housing 32, to which the third bearing 33 and the fourth bearing 34 are fixed, and the frame end 29 of the motor 10 are fixed together with bolts (not shown).

The worm wheel 6 is fixed to the column shaft 3 and is rotatable integrally with the column shaft 3. A rotational axis O1 of the worm 5 and a rotational axis O2 of the worm wheel 6 are generally perpendicular to each other. A gear 52 of the worm 5 is meshed with a gear 61 of the worm wheel 6. Thereby, the torque, which is outputted from the motor 10, is transmitted from the worm 5, which is rotated integrally with the rotatable shaft 14, to the column shaft 3 through the worm wheel 6.

Here, a radial direction of the rotatable shaft 14, along which the worm 5 and the worm wheel 6 are placed one after another, is defined as an X-direction, and another radial direction of the rotatable shaft 14, which is perpendicular to the X-direction, is defined as a Y-direction. Furthermore, a direction, which is perpendicular to the X-direction and the Y-direction, is defined as a Z-direction.

When the torque is transmitted from the worm 5 to the worm wheel 6 upon rotation of the rotatable shaft 14 of the motor 10 in a forward direction or reverse direction, the worm 5 tends to vibrate in the X-direction about a vibration center that is at or around a meshed position where the worm 5 is meshed with the worm wheel 6, as indicated by an arrow A in FIG. 2. The O-ring 28 limits such vibrations and generation of noises caused by the vibrations.

Figure 3:
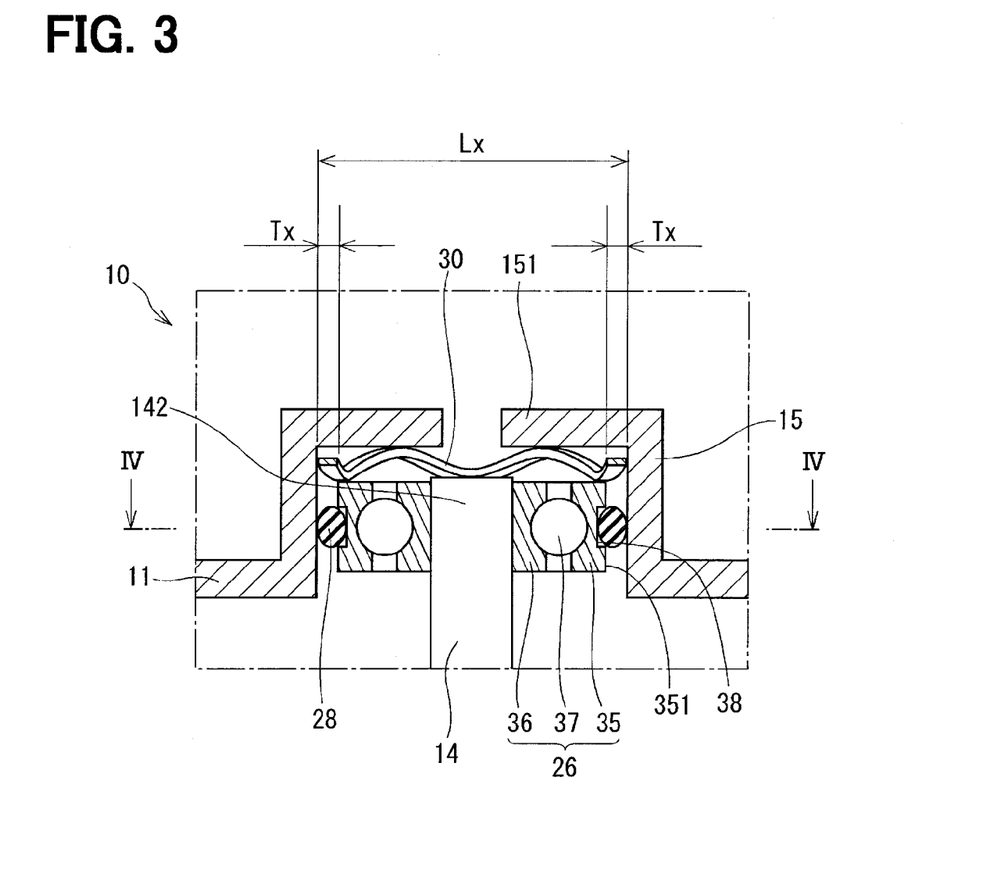
FIG. 3 is a partial enlarged view of an area III in FIG. 2.
Figure 4:
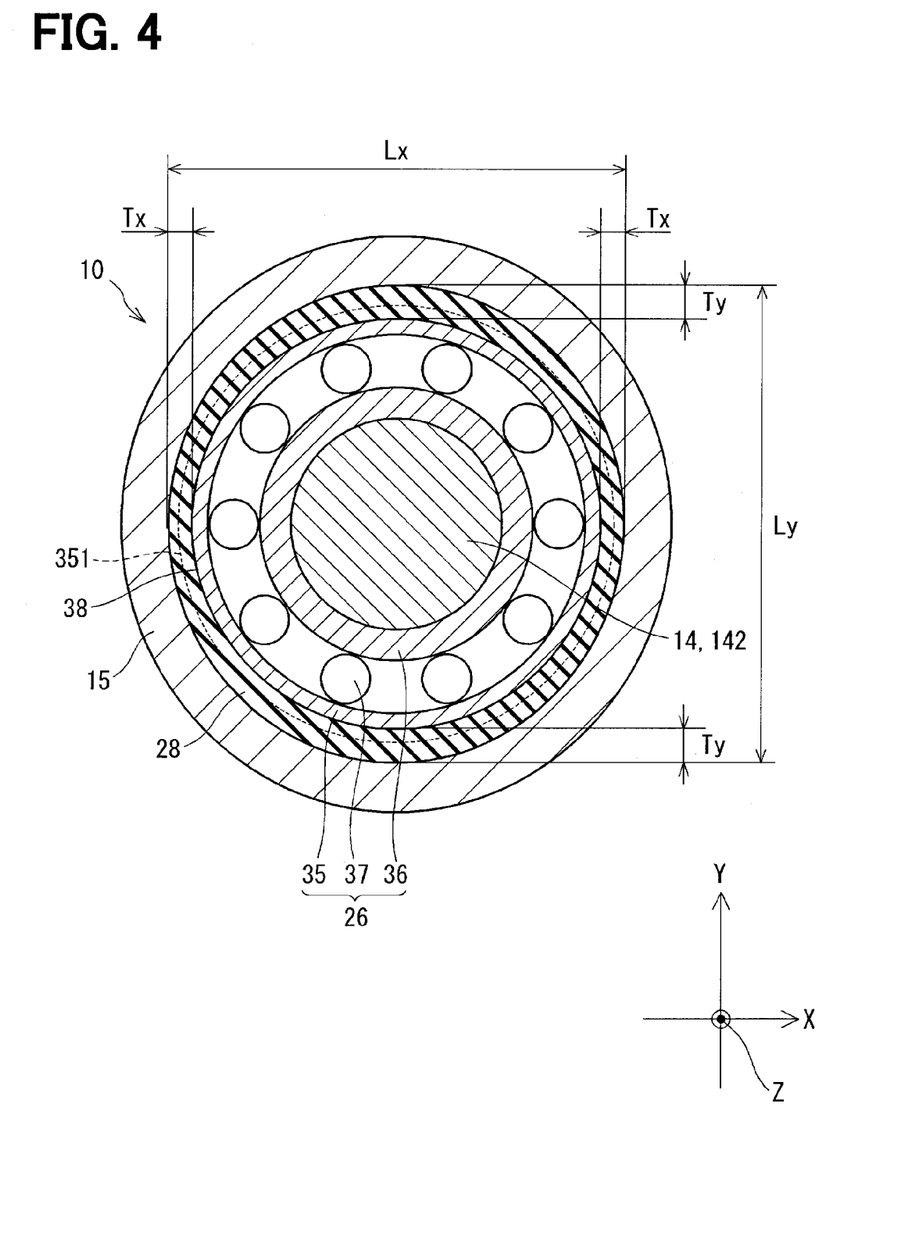
FIG. 4 is a cross-sectional view taken along line IV-IV in FIG. 3.

As shown in FIGS. 3 and 4, in the bearing box 15, a distance Ly, which is measured along the Y-direction between two opposed parts of an inner wall (also referred to as an inner peripheral wall) of the bearing box 15 that are opposed to each other along the Y-direction, is larger than a distance Lx, which is measured along the X-direction between two opposed parts of the inner wall of the bearing box 15, which are opposed to each other along the X-direction. In the first embodiment, a cross section of the inner wall of the bearing box 15 is in a form of an ellipse in an axial view taken along an axial direction of the rotatable shaft 14, as indicated in FIG. 4. In FIG. 4, a major axis of this cross section, which is in the form of the ellipse, extends along the Y-direction, and a minor axis of the this cross section extends along the X-direction. This configuration of the bearing box 15 can be formed through, for example, a press-working process or a cutting process.

The first bearing 26, which is installed in the inside of the bearing box 15, includes an outer race 35, an inner race 36, balls 37, and a retainer (not shown). In the first bearing 26, each of the outer race 35 and the inner race 36 is configured into a circular form in the axial view taken along the axial direction of the rotatable shaft 14. An annular groove 38, which is radially inwardly recessed, is formed in an outer peripheral surface of the outer race 35. The O-ring 28 is fitted into the annular groove 38.

A dotted circle shown in FIG. 4 indicates the outer peripheral surface 351 of the outer race 35.

In a free state of the O-ring 28, which is a state before installation of the O-ring 28 to the annular groove 38 of the first bearing 26 and the bearing box 15, the O-ring 28 has a circular cross section, and a radial wall thickness of the O-ring 28 is generally constant along an entire circumferential extent of the O-ring 28. In an installed state of the O-ring 28 where the O-ring 28 is installed between the inner wall of the bearing box 15 and the outer race 35 of the first bearing 26, a radial wall thickness Tx of each of two opposed parts of the O-ring 28, which are opposed to each other along the X-direction, becomes smaller than a radial wall thickness Ty of each of two opposed parts of the O-ring 28, which are opposed to each other along the Y-direction. Thus, in the installed state of the O-ring 28 where the O-ring 28 is installed between the inner wall of the bearing box 15 and the outer race 35 of the first bearing 26, the amount of compression of each of the two opposed parts of the O-ring 28, which are opposed to each other along the X-direction, is larger than the amount of compression of each of the two opposed parts of the O-ring 28, which are opposed to each other along the Y-direction. Therefore, a preload, which is applied along the X-direction from the O-ring 28 to the inner wall of the bearing box 15 and the outer race 35 of the first bearing 26, becomes relatively large, and a preload, which is applied along the Y-direction from the O-ring 28 to the inner wall of the bearing box 15 and the outer race 35 of the first bearing 26, becomes relatively small. In other words, the preload, which is applied along the X-direction from the O-ring 28 to the inner wall of the bearing box 15 and the outer race 35 of the first bearing 26 is larger than the preload, which is applied along the Y-direction from the O-ring 28 to the inner wall of the bearing box 15 and the outer race 35 of the first bearing 26. The preload of the O-ring 28 applied along the X-direction is set to a value that can limit generation of the vibrations and generation of the noises caused by the vibrations at the time of transmitting the torque from the worm 5 to the worm wheel 6.

A wave washer 30 is received between an axial end part of the first bearing 26 and a bottom portion 151 of the bearing box 15. The wave washer 30 limits generation of vibrations in the axial direction of the rotatable shaft 14 and generation of noises caused by such vibrations.

Figure 5:
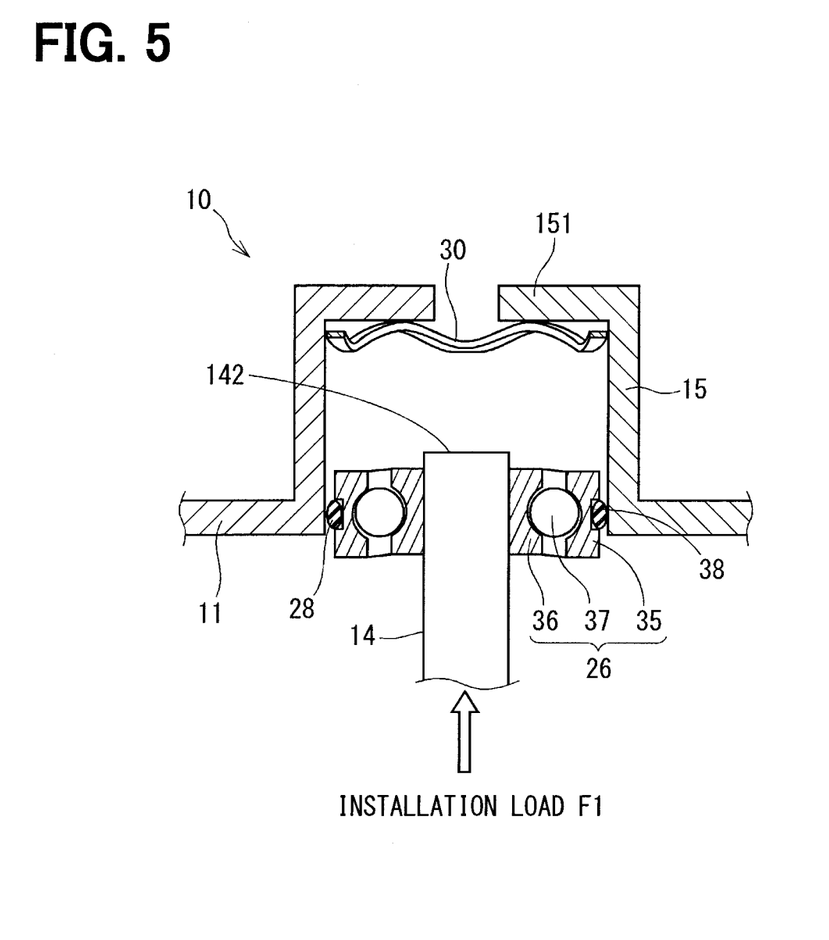
FIG. 5 is a schematic diagram showing an installation state of a rotatable shaft of an electric motor according to the first embodiment.

An exemplary assembling method for assembling the rotatable shaft 14 of the motor 10 according to the first embodiment will be described with reference to FIG. 5.

First of all, the inner race 36 of the first bearing 26 is securely press-fitted to the end part 142 of the rotatable shaft 14, which is opposite from the output end part 141 of the rotatable shaft 14. At this time, it is assumed that the O-ring 28 has been already fitted into the annular groove 38 of the first bearing 26. Here, it should be noted that the O-ring 28 may be fitted into the annular groove 38 after that the first bearing 26 is securely press fitted to the rotatable shaft 14.

Next, the wave washer 30 is inserted into the bearing box 15.

Then, the rotatable shaft 14, the first bearing 26 and the O-ring 28 are installed to the bearing box 15. At this time, the rotatable shaft 14 is moved toward the bottom portion 151 of the bearing box 15 such that the O-ring 28 is slid along the inner wall of the bearing box 15 while compressing the O-ring 28. At this time, the O-ring 28 is compressed such that the amount of compression of each of the two opposed parts of the O-ring 28, which are opposed to each other along the X-direction, is relatively large, and the amount of compression of each of the two opposed parts of the O-ring 28, which are opposed to each other along the Y-direction, is relatively small. Thus, a required installation load F1, which is required for the installation of the rotatable shaft 14, is smaller than a required installation load F2 of a comparative example discussed below. Thereby, it is possible to limit occurrence of disadvantage(s), such as unintentional removal of the O-ring 28 from the annular groove 38 of the first bearing 26 and unintentional cutting (severing) of the O-ring 28. Furthermore, the reduction of the required installation load F1, which is required for the installation, reduces a load applied at contacts among the inner race 36, the outer race 35, and the balls 37 of the first bearing 26. Thereby, it is possible to limit generation of an impression in the first bearing 26 caused by application of the load in the first bearing 26. Thereby, in the motor 10, it is possible to limit generation of the vibrations and generation of the noises at the time of transmitting the torque.

Figure 6:
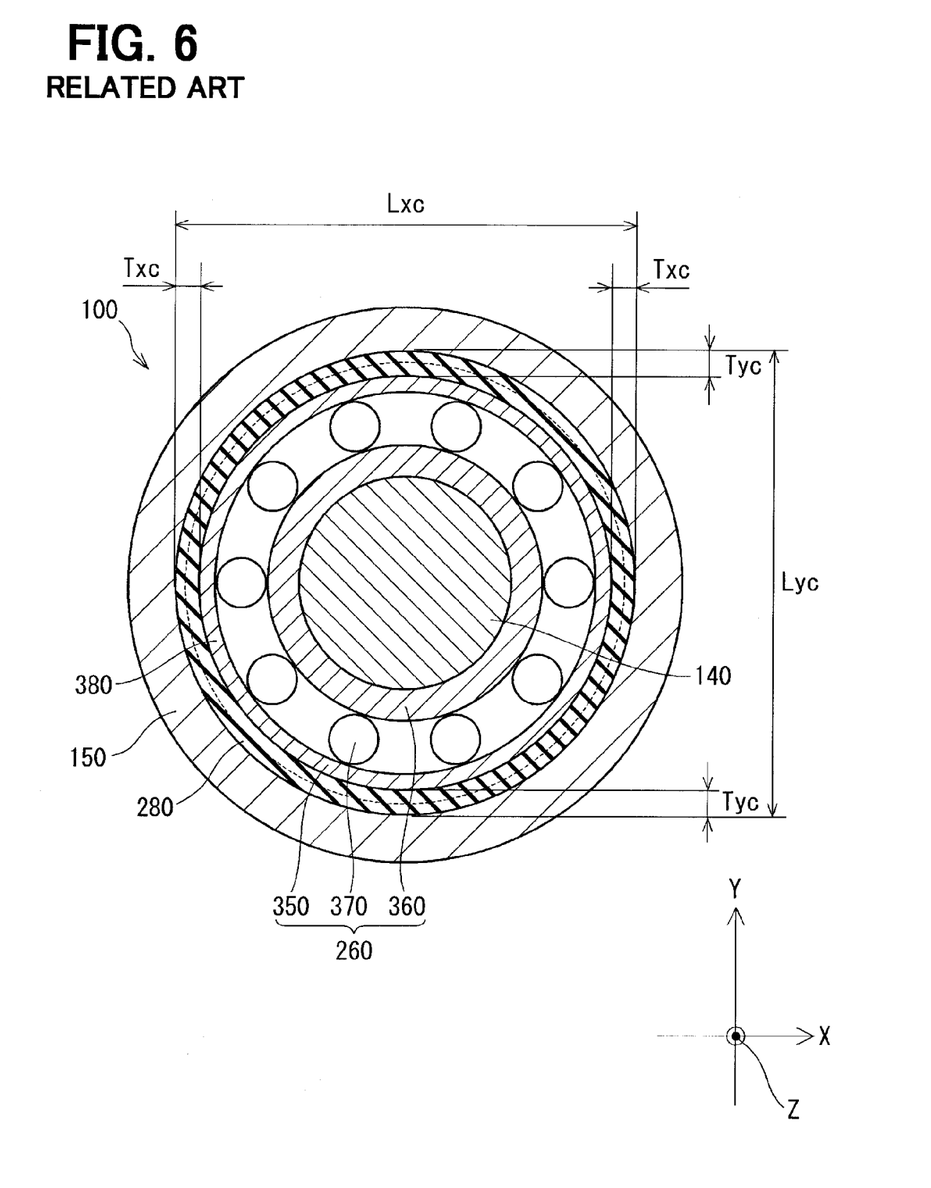
FIG. 6 is a cross-sectional view showing a characteristic feature of an electric motor of a comparative example.
Figure 7:
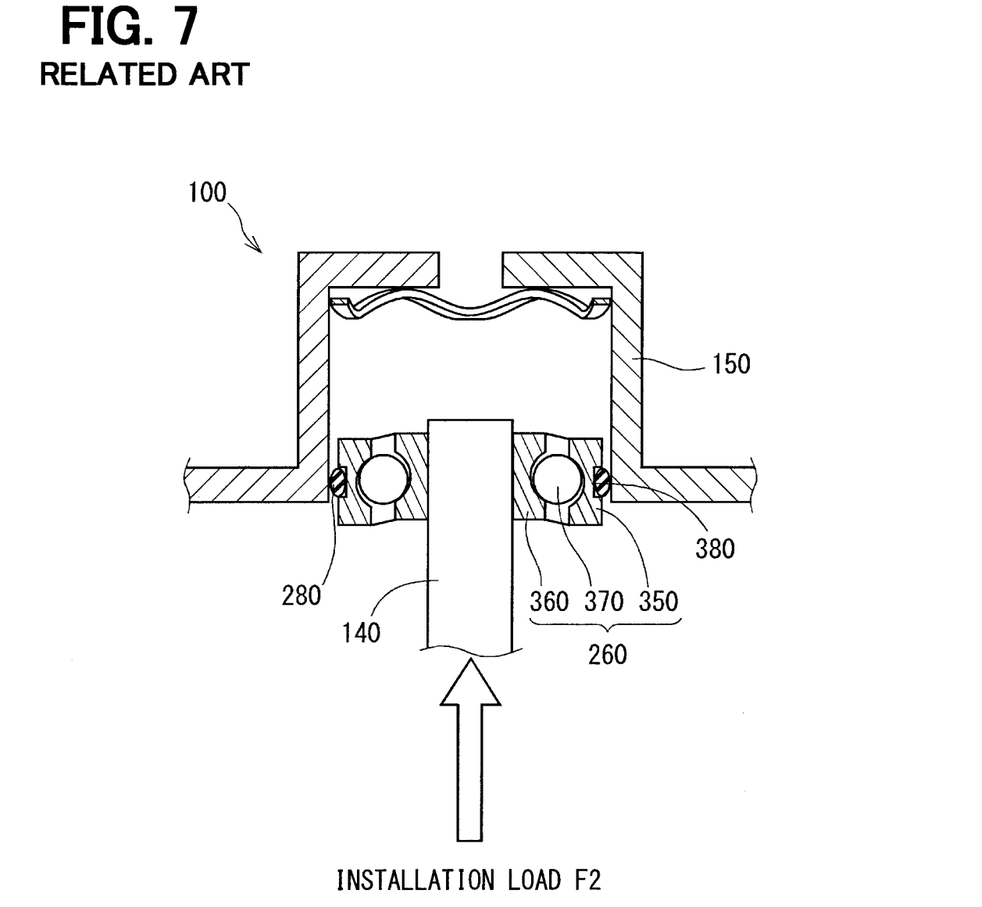
FIG. 7 is a schematic diagram sowing an installation state of a rotatable shaft of the electric motor of the comparative example.

FIG. 6 is a cross sectional view showing a characteristic feature of an electric motor 100 of a comparative example. FIG. 7 is a schematic diagram showing an installation state of a rotatable shaft 140 of the motor 100.

As shown in FIG. 6, in the motor 100 of the comparative example, a cross section of an inner wall of a bearing box 150, which is taken in an axial direction of the rotatable shaft 140, has a circular form. Therefore, in the bearing box 150, a distance Lyc, which is measured along the Y-direction between two opposed parts of the inner wall of the bearing box 150 that are opposed to each other along the Y-direction, is equal to a distance Lxc, which is measured along the X-direction between two opposed parts of the inner wall of the bearing box 150, which are opposed to each other along the X-direction. In an installed state of an O-ring 280 where the O-ring 280 is installed between the inner wall of the bearing box 150 and an outer race 350 of a first bearing 260, a radial wall thickness Txc of each of two opposed parts of the O-ring 280, which are opposed to each other along the X-direction, is equal to a radial wall thickness Tyc of each of two opposed parts of the O-ring 28, which are opposed to each other along the Y-direction.

Even in the comparative example, each of a preload of the O-ring 280, which is applied from the O-ring 280 to the inner wall of the bearing box 150 in the X-direction, and a preload of the O-ring 280, which is applied from the O-ring 280 to the inner wall of the bearing box 150 in the Y-direction, is set to a corresponding value that can limit generation of the vibrations and generation of the noises caused by the vibrations at the time of transmitting the torque from the worm 5 to the worm wheel 6. Specifically, in the installed state of the O-ring 280, each of the amount of compression of the O-ring 280 along the X-direction and the amount of compression of the O-ring 280 along the Y-direction is equal to the amount of compression of the O-ring 28 along the X-direction of the first embodiment.

FIG. 7 shows the state at the time of installing the rotatable shaft 140, the first bearing 260, and the O-ring 280 to the bearing box 150 at the motor 100 of the comparative example.

As discussed above, in the installed state of the O-ring 280 of the comparative example, each of the amount of compression of the O-ring 280 along the X-direction and the amount of compression of the O-ring 280 along the Y-direction is equal to the amount of compression of the O-ring 28 of the first embodiment along the X-direction. Therefore, the required installation load F2 of the comparative example, which is required for the installation of the rotatable shaft 140, is larger than the required installation load F1 of the first embodiment, which is required for the installation of the rotatable shaft 14. Thereby, in the comparative example, unintentional removal of the O-ring 280 from the annular groove 380 of the first bearing 260 might possibly occur, and unintentional cutting (severing) of the O-ring 280 might possibly occur.

Furthermore, as shown in FIG. 7, the load, which is applied at the contacts among the inner race 360, the outer race 350, and the balls 370 of the bearing, might possibly be increased. Thereby, in the first bearing 260, an impression might possibly be formed through the application of the load at contacts among the outer race 350, the inner race 360, the balls 370, and the retainer.

In contrast, the motor 10 and the electric power steering apparatus 1 of the first embodiment provides the following advantages.

(1) In the bearing box 15 of the motor 10 of the first embodiment, the distance Ly, which is measured along the Y-direction between the two opposed parts of the inner wall of the bearing box 15, is larger than the distance Lx, which is measured along the X-direction between the two opposed parts of the inner wall of the bearing box 15.

Therefore, the O-ring 28 is compressed such that the amount of compression of each of the two opposed parts of the O-ring 28, which are opposed to each other along the X-direction, is relatively large, and the amount of compression of each of the two opposed parts of the O-ring 28, which are opposed to each other along the Y-direction, is relatively small. Therefore, a preload, which is applied along the X-direction from the O-ring 28 to the bearing box 15 and the first bearing 26, becomes relatively large, and a preload, which is applied along the Y-direction from the O-ring 28 to the bearing box 15 and the first bearing 26, becomes relatively small. When the preload, which is applied to the O-ring 28 in the X-direction, is increased, it is possible to limit collision between the outer race 35 of the first bearing 26, which is installed to the rotatable shaft 14, and the inner wall of the baring box 15. Thus, at the motor 10, it is possible to limit the generation of the vibrations and the noises at the time of transmitting the torque from the worm 5 to the worm wheel 6.

Furthermore, the amount of compression of the O-ring 28 along the X-direction is set to be relatively large, and the amount of compression of the O-ring 28 along the Y-direction is set to be relatively small. In this way, the installation load at the time of installing the first bearing 26 and the O-ring 28 to the bearing box 15 can be reduced. Therefore, it is possible to limit the occurrence of the disadvantage(s), such as the unintentional removal of the O-ring 28 and the unintentional cutting (severing) of the O-ring 28. Furthermore, at the time of installation, it is possible to reduce the load applied at the contacts among the inner race 36, the outer race 35, and the balls 37 of the first bearing 26. Thereby, it is possible to limit the generation of the impression in the first bearing 26. Thus, in the motor 10, it is possible to limit generation of the vibrations and the noises at the time of transmitting the torque.

(2) The O-ring 28 of the motor 10 of the first embodiment is compressed such that the amount of compression of each of the two opposed parts of the O-ring 28, which are opposed to each other along the X-direction, is larger than the amount of compression of each of the two opposed parts of the O-ring 28, which are opposed to each other along the Y-direction.

In this way, the preload, which is applied along the X-direction from the O-ring 28 to the bearing box 15 and the first bearing 26, can be set to be larger than the preload, which is applied along the Y-direction from the O-ring 28 to the bearing box 15 and the first bearing 26.

(3) The cross section of the inner wall of the bearing box 15 of the motor 10 of the first embodiment is in the form of the ellipse in the axial view taken along the axial direction of the rotatable shaft 14.

With this configuration of the bearing box 15, the amount of compression of the O-ring 28 along the X-direction becomes larger than the amount of compression of the O-ring 28 along the Y-direction. Thus, the preload, which is applied along the X-direction from the O-ring 28 to the bearing box 15 and the first bearing 26, can be set to be larger than the preload, which is applied along the Y-direction from the O-ring 28 to the bearing box 15 and the first bearing 26.

(4) The electric power steering apparatus 1 of the first embodiment includes the motor 10, the worm 5, the worm wheel 6 and the column shaft 3.

This electric power steering apparatus 1 can limit the generation of the vibrations and the noises at the time of transmitting the torque of the motor 10 from the worm 5 to the worm wheel 6.

Second Embodiment

Figure 8:
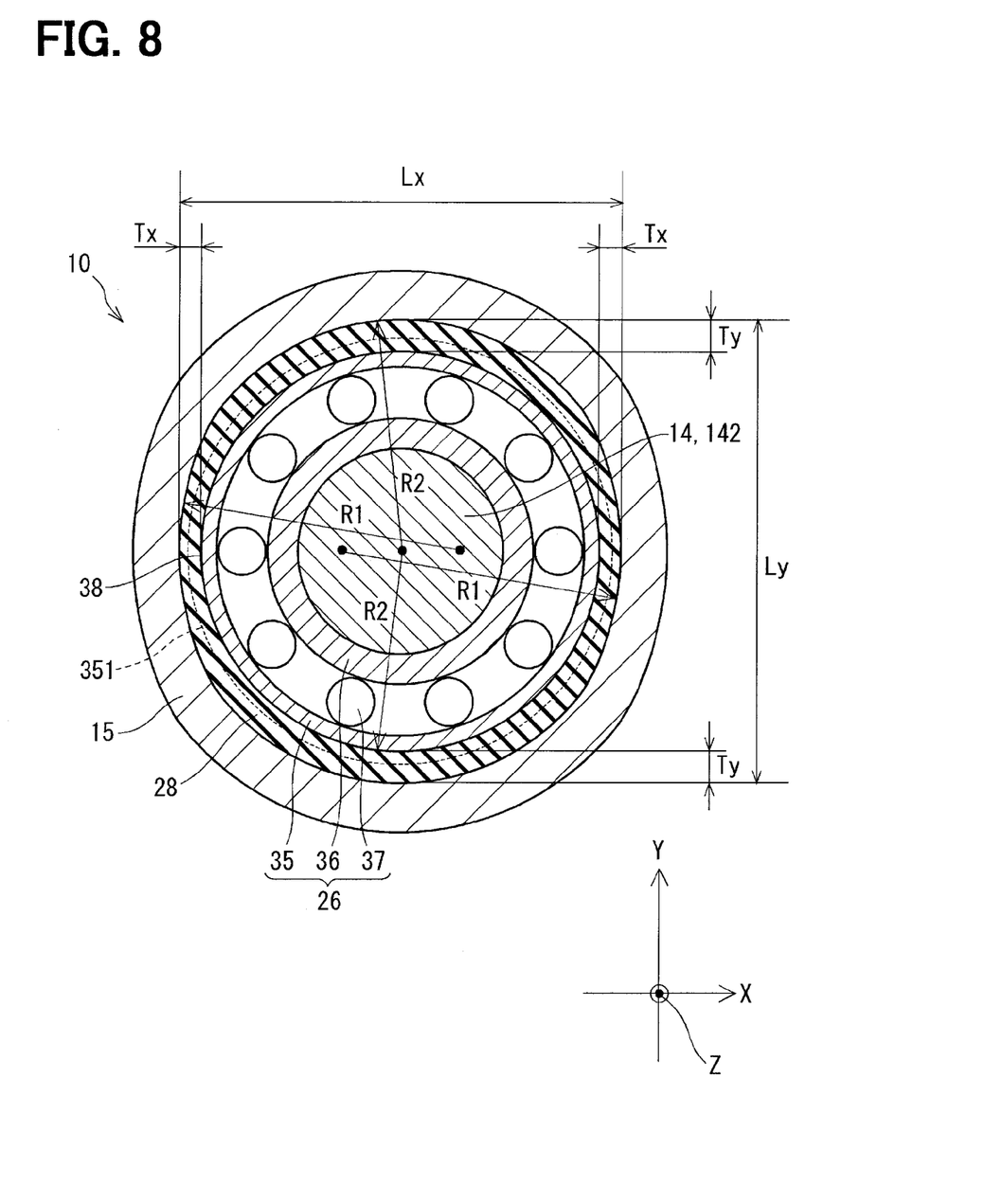
FIG. 8 is a cross-sectional view showing a characteristic feature of an electric motor according to a second embodiment of the present disclosure.

FIG. 8 shows a second embodiment of the present disclosure. In the second embodiment, components, which are similar to those discussed in the first embodiment, will be indicated by the same reference numerals and will not be discussed further.

In the second embodiment, the configuration of the bearing box 15 is different from that of the first embodiment. In the bearing box 15 of the second embodiment, a radius of curvature R1 of each of the two opposed parts of the inner wall of the bearing box 15, which are opposed to each other along the X-direction, is larger than a radius of curvature R2 of each of the two opposed parts of the inner wall of the bearing box 15, which are opposed to each other along the Y-direction.

In this way, in the bearing box 15, the amount of compression of the two opposed parts of the O-ring 28, which are opposed to each other along the X-direction, can be made larger than the amount of compression of the two opposed parts of the O-ring 28, which are opposed to each other along the Y-direction. Thus, the preload, which is applied along the X-direction from the O-ring 28 to the bearing box 15 and the first bearing 26, can be set to be larger than the preload, which is applied along the Y-direction from the O-ring 28 to the bearing box 15 and the first bearing 26. Therefore, the advantages, which are the same as those of the first embodiment, can be achieved.

Other Embodiments (1) In the above embodiments, the brushless motor is described as the example of the drive device. In contrast, in another embodiment, the drive device may be a brushed motor.

(2) In the above embodiments, the motor 10 includes the wave washer 30 at the inside of the bearing box 15. In contrast, in another embodiment, the wave washer 30 may be eliminated.

(3) In the above embodiments, the motor 10 includes the single O-ring 28 installed to the outer race 35 of the first bearing 26. In contrast, in another embodiment, the motor 10 may include a plurality of O-rings 28 installed to the outer race 35 of the first bearing 26.

(4) In the above embodiments, the O-ring 28 is fitted into the annular groove 38 formed in the outer race 35 of the first bearing 26. Alternatively, in another embodiment, an annular groove may be formed in the inner wall of the bearing box 15, and the O-ring 28 may be fitted into this groove.

(5) In the electric power steering apparatus 1 of the above embodiments, the O-ring 28 is installed to the first bearing 26, which supports the end part 142 of the rotatable shaft 14 that is opposite from the output end part 141 of the rotatable shaft 14. In contrast, in the electric power steering apparatus 1 of another embodiment, the O-ring 28 may be installed to the second bearing 27, which supports the output end part 141 of the rotatable shaft 14, or the third bearing 33 or the fourth bearing 34, which support the worm 5. In such a case, desirably, a receiving portion of the frame end 29 or a receiving portion of the housing 32, which receives the corresponding one of the second to fourth bearings 27, 33, 34, is configured such a distance, which is measured along the Y-direction between two opposed parts of the inner wall of the receiving portion that are opposed to each other along the Y-direction, is larger than a distance, which is measured along the X-direction between two opposed parts of the inner wall of the receiving portion, which are opposed to each other along the X-direction.

(6) In the above embodiments, there is described the motor 10, which drives the worm 5 that is meshed with the worm wheel 6 installed to the column shaft 3. In contrast, in another embodiment, the motor 10 may be suitable for a case where the torque is transmitted to the rack shaft 8 through the worm wheel 6 and the worm 5.

The present disclosure is not limited the above embodiments. That is, the above embodiments may be further modified in various ways without departing from the principle of the present disclosure.

What is claimed is:

1. A drive device that outputs a drive force, which assists a steering operation of a driver of a vehicle by rotating a worm that is meshed with a worm wheel installed to a drive force transmission shaft for transmitting a steering force of the driver to a steerable wheel of the vehicle, the drive device comprising:
    a stator;
    a rotor that is rotatably placed on a radially inner side of the stator;
    a rotatable shaft that is rotatable integrally with the rotor and is connectable with one axial end part of the worm;
    a case that receives the stator and the rotor;
    a bearing box that is placed on an opposite side of the case, which is opposite from the worm;
    a bearing that is received in the bearing box and rotatably supports an end part of the rotatable shaft, which is opposite from the worm; and
    a resilient member that is in a form of a ring and is placed between an inner wall of the bearing box and an outer race of the bearing, wherein:
    a radial direction of the rotatable shaft, along which the worm and the worm wheel are placed one after another, is defined as an X-direction, and another radial direction of the rotatable shaft, which is perpendicular to the X-direction, is defined as a Y-direction; and
    a distance, which is measured along the Y-direction between two opposed parts of the inner wall of the bearing box that are opposed to each other along the Y-direction, is larger than a distance, which is measured along the X-direction between two opposed parts of the inner wall of the bearing box, which are opposed to each other along the X-direction.

2. The drive device according to claim 1, wherein an amount of compression of each of two opposed parts of the resilient member, which are opposed to each other along the X-direction, is larger than an amount of compression of each of two opposed parts of the resilient member, which are opposed to each other along the Y-direction.

3. The drive device according to claim 1, wherein a radius of curvature of each of the two opposed parts of the inner wall of the bearing box, which are opposed to each other along the X-direction, is larger than a radius of curvature of each of the two opposed parts of the inner wall of the bearing box, which are opposed to each other along the Y-direction.

4. The drive device according to claim 1, wherein a cross section of the inner wall of the bearing box is in a form of an ellipse in an axial view taken along an axial direction of the rotatable shaft.

5. An electric power steering apparatus that assists a steering operation of a driver of a vehicle who is operating a steering wheel of the vehicle, the electric power steering apparatus comprising:
    the drive device of claim 1;
    the worm that is connected to the one axial end part of the rotatable shaft, which projects from the case of the drive device, wherein the worm is rotatable integrally with the rotatable shaft;
    the worm wheel that is meshed with the worm; and
    the drive force transmission shaft that is rotatable integrally with the worm wheel and transmits a steering force to the steerable wheel.

* * * * *